J. C. MILLER.
ICE CREAM FREEZER.
APPLICATION FILED OCT. 13, 1913.
1,228,804.
Patented June 5, 1917.
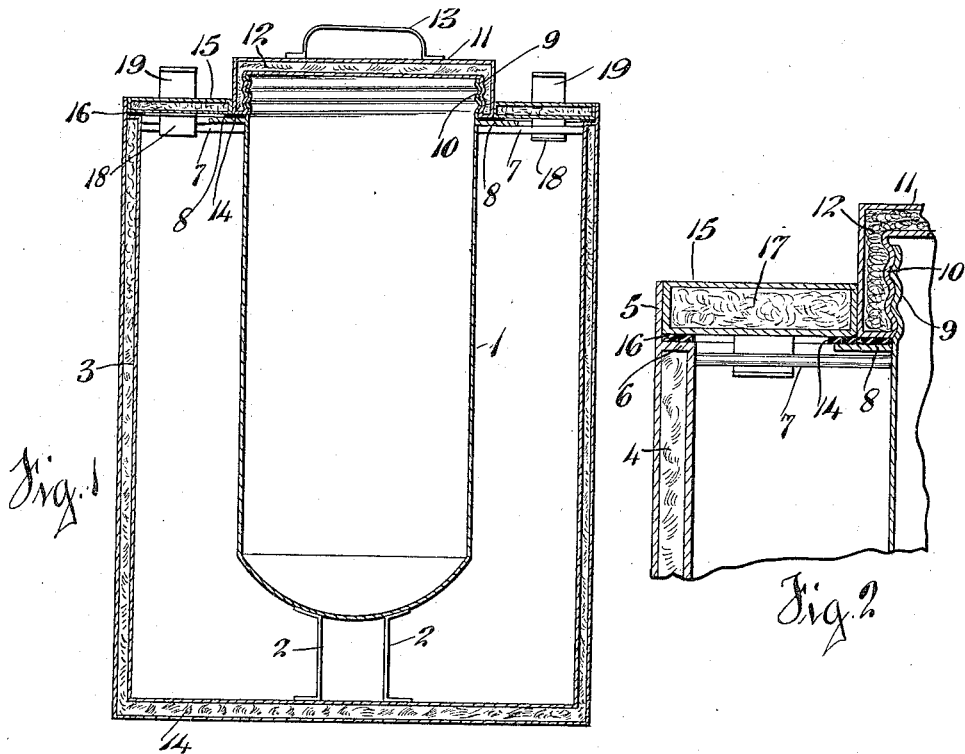
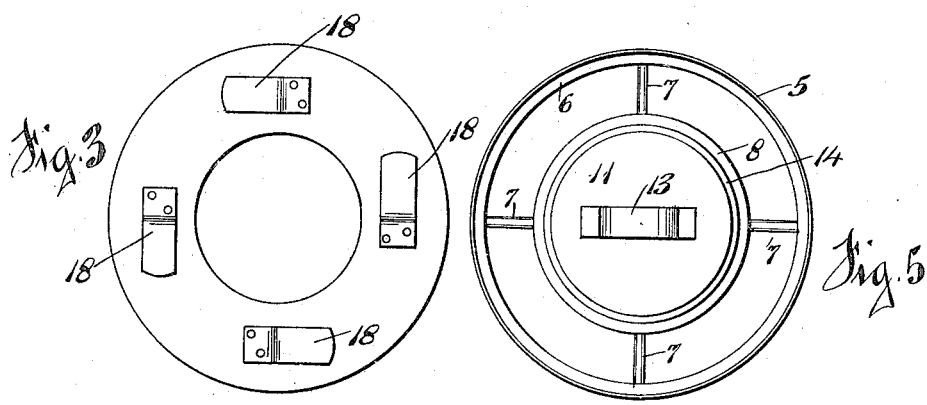
Witnesses
Inventor
John C Miller

UNITED STATES PATENT OFFICE.

JOHN C. MILLER, OF COVINGTON, KENTUCKY, ASSIGNOR, BY MESNE ASSIGNMENTS, TO THE CINCINNATI CAN COMPANY, OF CINCINNATI, OHIO, A CORPORATION OF OHIO.

ICE-CREAM FREEZER.

1,228,804.   Specification of Letters Patent.   Patented June 5, 1917.

Application filed October 13, 1913. Serial No. 794,767.

*To all whom it may concern:*

Be it known that I, JOHN C. MILLER, a citizen of the United States, and a resident of the city of Covington, in the county of Kenton and State of Kentucky, have invented certain new and useful Improvements in Ice-Cream Freezers, of which the following is a full, clear, and exact description, reference being had to the accompanying drawings, forming part of this specification.

The object of my invention is to provide a construction of freezer for ice cream and other like material, in which the material to be treated may be suitably frozen without the necessity of the manual labor usually required in rotating a beater or scraper, and in which the material may be placed in the receptacle and allowed to freeze without any further care and attention.

The invention consists of that certain novel construction of receptacles for the cream and the refrigerant in which both the refrigerant and material to be frozen may be readily and easily deposited and removed from the receptacles, and in which the receptacles may be thoroughly insulated from the outer air and closed airtight during the process.

In the drawings,

Figure 1 is a central vertical section of my improved freezer.

Fig. 2 is a similar section of a portion of the upper part of the freezer, enlarged.

Fig. 3 is a bottom plan view of the lid or cover for the outer vessel.

Fig. 4 is a side elevation of the same.

Fig. 5 is a top plan view of the freezer with the cover of the outer vessel removed.

The receptacle for the material to be frozen consists of a sheet metal vessel 1, preferably cylindrical in shape. This vessel is permanently supported in fixed position by the standards or legs 2, 2, centrally within a refrigerant container 3. This outer vessel or container is preferably a cylindrical vessel, with double side walls and bottom, and with the space between the walls filled with suitable insulating material 4. At the top, the outer wall of this vessel is continued upward to form a vertical flange 5, and the space between the two walls is closed by a horizontal portion 6 to form a base upon which to lock the cover for the outer vessel.

The inner receptacle 1 is thoroughly braced and held in position by brace rods 7, 7, extending horizontally between the two vessels at the upper end. The vessel 1 is provided with the horizontal outwardly projecting flange 8 and the portion above this flange is formed with screwthreads 9 to receive the screw-threaded portion 10 of the cover 11 for the inner vessel.

This cover is made hollow, with double walls throughout and is also filled with suitable insulating material 12, and the cover is provided with a handle 13, so that it may be readily removed and screwed to place. The washer of rubber or other suitable material 14 is provided for the flange 8, and the cover fits down tightly upon this washer, so as to effectively form an airtight closure.

Also resting on this rubber washer 14 and flange 8 is the inner portion of the refrigerant cover 15, while the outer edge of this cover fits upon the washer 16 on the base 6, inside the flange 5. This cover 15 is an annular cover with hollow walls filled with suitable insulating material 17.

To draw the annular cover down tightly on the washer to form an airtight closure for the outer vessel, I secure to the under surface of the cover the plates 18, four in number, to correspond to the number of braces 7. These plates are secured at one end and flared outwardly to engage each under its respective brace when the cover is turned by the handles 19, so as to draw the cover tightly down on the washer.

It will be evident from the foregoing description that when the covers for the two vessels are located in place and securely fastened, that an effective airtight closure will be provided for the two vessels, and that all portions of the two vessels exposed to the outer atmosphere will be insulated therefrom. It will also be evident that the two covers can be readily and easily located in place or removed.

In the use of the freezer, the cover 11 of the inner vessel is removed and the material to be frozen placed therein. The cover is then screwed down so as to make a tight closure, and the cover 15 of the outer vessel removed, and the outer vessel filled with the refrigerant material, cracked ice and salt, or other cold producing material. The cover is then returned to place and locked tight.

As the vessels are thoroughly insulated, the heat required to melt the cracked ice is taken from the inner vessel and the liquid contents are frozen in a very short time. If it is desired, after the cream has been subjected to the refrigerating temperature for a short time, the cover 11 may be removed and the congealed portions scraped from the side walls of the inner vessel with a knife or suitable scraper and the contents may be beaten up. The cover is then returned and the material is frozen solid in a short time.

Having thus described my invention, what I claim as new and desire to secure by Letters Patent, is:—

1. In an ice cream freezer, the combination of two receptacles, one located within the other, with both vessels opening at the top, a cover for the outer vessel, means for providing a water tight seat for the lower edge of said cover on the inner vessel, a cover for the inner vessel adapted to pass over the outside thereof, means for providing a water tight seat for its lower edge on the inner vessel independent of the outer cover, and securing means for holding each cover in place.

2. In an ice cream freezer, the combination of two receptacles, one located within the other, with both vessels opening at the top, an annular shoulder on the outside of the inner vessel, a cover for the outer vessel seating on said shoulder, a cover for the inner vessel likewise seating on said shoulder independent of the outer cover, and securing means for holding each cover in place.

3. In an ice cream freezer, the combination with two receptacles, one located within the other, with both vessels opening at the top, a cover for the outer vessel, means for providing a seat for the lower edge of said cover on the inner vessel, insulation for said seat, a cover for the inner vessel, means for providing a seat for its lower edge on the inner vessel independent of the outer cover, means for insulating said latter seat, and securing means for holding the said covers in place tightly against their seats.

4. In an ice cream freezer, the combination with two receptacles, one located within the other, with both vessels opening at the top, a cover for the outer vessel, means for seating the lower edge of said cover on the inner vessel, insulation for said seat, a cover for the inner vessel, means for seating its lower edge on the inner vessel independent of the outer cover, means for insulating said latter seat, and securing means for holding the said covers in place tightly against their seats, said two covers and the walls of the outer receptacle being hollow and filled with insulating material.

5. In an ice cream freezer, the combination of two receptacles, the one located within the other, with both vessels opening at the top, and separate covers for said vessels, the outer vessel formed with a seat at its upper end and a flange on the inner vessel coöperating with the seat to form a support for the cover of the outer vessel, brace rods to secure the inner vessel in fixed position within the outer vessel, and plates flaring downwardly secured to the under surface of the cover and adapted to engage the braces when the cover is turned to lock the same in place and form an airtight closure.

JOHN C. MILLER.

Attest:
MARSTON ALLEN,
HELEN L. AICHHOLZ.

Copies of this patent may be obtained for five cents each, by addressing the "Commissioner of Patents, Washington, D. C."